(12) United States Patent
Maeda (10) Patent No.: US 8,106,875 B2
(45) Date of Patent: Jan. 31, 2012

(54) DISPLAY DEVICE

(75) Inventor: Akitoshi Maeda, Shiojiri (JP)

(73) Assignee: Seiko Epson Corporation (JP)

( * ) Notice: Subject to any disclaimer, the term of this patent is extended or adjusted under 35 U.S.C. 154(b) by 324 days.

(21) Appl. No.: 12/555,883

(22) Filed: Sep. 9, 2009

(65) Prior Publication Data

US 2010/0066711 A1 Mar. 18, 2010

(30) Foreign Application Priority Data

Sep. 12, 2008 (JP) ................................ 2008-235372

(51) Int. Cl.
*G09G 3/36* (2006.01)
(52) U.S. Cl. ........................................ 345/100; 345/206
(58) Field of Classification Search .......................... None
See application file for complete search history.

(56) References Cited

U.S. PATENT DOCUMENTS 7,142,200 B2 * 11/2006 Yamagishi et al. ............ 345/204
7,570,072 B2 * 8/2009 Hata et al. .................. 324/760.01

FOREIGN PATENT DOCUMENTS

JP 2003-157053 5/2003

* cited by examiner

*Primary Examiner* — Paul Huber
(74) *Attorney, Agent, or Firm* — Harness, Dickey & Pierce, P.L.C.

(57) ABSTRACT

A display device includes: two substrates sandwiching electro-optic material; source and gate lines on one substrate; switching elements coupled to the gate lines; a counter electrode coupled to pixel electrodes; gate dummy pixels including: gate dummy pixel electrodes applying an electric charge to the electro-optic material, and gate dummy switching elements switching between the gate lines and the gate dummy pixel electrodes; source dummy pixels including: source dummy pixel electrodes applying an electric charge to the electro-optic material, and source dummy switching elements switching between the source lines and the source dummy pixel electrodes; a test switch line transmitting a control signal controlling switching of the gate and source dummy switching elements; and test gate and source lines coupled to non-adjacent gate and source dummy pixel electrodes so that the gate and source lines provided with the gate and source dummy pixel electrodes are divided into two or more phases.

4 Claims, 4 Drawing Sheets

DISPLAY DEVICE

BACKGROUND

1. Technical Field

The present invention relates to a display device which displays an image.

2. Related Art

An inspection device and an inspection method for inspecting a display defect in display devices such as a liquid crystal panel are known, as disclosed in JP-A-2003-157053 as a first example.

The first example discloses an inspection device of a liquid crystal display device in which a plurality of source lines and a plurality of gate lines are wired. In this inspection device, three source side inspection wirings, two gate side inspection wirings, an inspection gate wiring, and an inspection wiring for storage capacitance are formed to be extracted to an outside of a display region of the liquid crystal display device. The pixel defect inspection of the liquid crystal display device is performed by applying predetermined voltage to these inspection wirings.

In an inspection device such as that of the first example, inspection wirings need to be wired at the outside of the liquid crystal display device. However, high resolution of liquid crystal display devices has recently progressed, increasing the number of source lines and gate lines. Accordingly, an exclusive inspection circuit needs to be provided so as to couple the inspection wirings, which are panel inspection terminals, to the source lines and the gate lines, disadvantageously making the structure complicated.

SUMMARY

An advantage of the present invention is to provide a display device which is capable of inspecting a display defect with a simple structure.

A display device according to an aspect of the invention includes: a drive substrate; a counter substrate opposed to the drive substrate; an electro-optic material sealed between the drive substrate and the counter substrate; a plurality of source lines formed on the drive substrate; a plurality of gate lines formed on the drive substrate in an orthogonal manner to the source lines; a plurality of pixel electrodes formed near intersections of the plurality of source lines and the plurality of gate lines and applying electric charge outputted to the source lines to the electro-optic material; switching elements coupled to the gate lines and switching conduction states between the source lines and the pixel electrodes; a counter electrode formed on the counter substrate and coupled to the pixel electrodes; gate dummy pixels which includes: gate dummy pixel electrodes provided to first end sides of the gate lines and applying the electric charge from the gate lines to the electro-optic material, and gate dummy switching elements coupling the gate lines and the gate dummy pixel electrodes and switching conduction states between the gate lines and the gate dummy pixel electrodes; source dummy pixels which includes: source dummy pixel electrodes provided to first end sides of the source lines and applying the electric charge from the source lines to the electro-optic material, and source dummy switching elements coupling the source lines and the source dummy pixel electrodes and switching conduction states between the source lines and the source dummy pixel electrodes; a test switch line coupled to the gate switching elements and the source dummy switching elements and transmitting a control signal for controlling switching of the conduction states to the gate dummy switching elements and the source dummy switching elements; a plurality of test gate lines respectively coupled to the gate dummy pixel electrodes that are not adjacent to each other in such a manner that the gate lines provided with the gate dummy pixel electrodes are divided into two or more phases; and a plurality of test source lines respectively coupled to the source dummy pixel electrodes that are not adjacent to each other in such a manner that the source lines provided with the source dummy pixel electrodes are divided into two or more phases.

In the aspect, an inspection circuit is formed by using the gate dummy pixels and the source dummy pixels provided at the outside of the display region in the display device. Here, dummy pixels (the gate dummy pixels and the source dummy pixels) are commonly formed so as to prevent display pixels in the display region of the display device from being damaged by static. In the aspect, these dummy pixels are used also as an inspection circuit, requiring no exclusive circuit for inspection in the display device.

In the aspect, each of the dummy switching elements (the gate dummy switching elements and the source dummy switching elements) is coupled to the test switch line. The gate dummy pixels provided on the gate lines which are not adjacent to each other are connected to each other by the test gate line and the source dummy pixels provided on the source lines which are not adjacent to each other are connected to each other by the test source line so as to produce plurality of phases.

Accordingly, an ON signal is outputted to the test switch line to turn each of the dummy switching elements to the conductive state, and test drive charge is outputted in sequence to a predetermined test gate line and a predetermined test source line so as to perform the display defect inspection in each of the display pixels of the display device. The dummy pixels are used as the inspection circuit as described above, so that an exclusive circuit for inspection is not required, being able to simplify the structure. Also, the inspection can be performed only by applying test voltage to the test gate line and the test source line without applying the test voltage to each of the gate lines and each of the source lines. Thus the inspection of the display defect in the display device can be easily performed.

In the display device of the aspect, it is preferable that the plurality of gate lines be connected with each other by a common gate line, which is coupled to the counter electrode, at second end sides that are opposite sides to the first end sides on which the gate dummy pixels are provided, and the test switch line be coupled to the common gate line.

According to the aspect, the test switch line is coupled to the common gate line which is coupled to the counter electrode. In such structure, voltage for switching off is not required to be applied to the test switch line when the display device is installed in a module. That is, the display device can be installed in the module while the test switch electrode provided on the end of the test switch line is maintained at an open state.

For example, in the device of the first example, inspection gate wirings for applying voltage by which each switching element is on/off-controlled are provided in a circuit for inspecting the liquid crystal display device. However, a potential (OFF voltage), by which the inspection switching elements are not conducted, needs to be continuously applied to the inspection gate wirings when the liquid crystal display device is installed in the module. In such the case, when there is a problem on an electrode for applying voltage to each of the inspection switching elements, for example, the OFF voltage is not properly applied to the inspection gate wirings, whereby the display device does not properly work. Thus there has been a problem of reliability of the display device.

On the other hand, in the aspect of the invention, the second ends of the gate lines are connected with each other by the test switch line, and the test switch line is coupled to the common gate line which is coupled to the counter electrode. Commonly, when the display device is driven, the plurality of gate lines are driven in sequence and the electric charge is maintained in each of the display pixels so as to display an image corresponding to an image signal. Therefore, even in a state that ON voltage (15V, for example) is applied to one gate line, a state that OFF voltage (0V, for example) is applied to the rest of gate lines is produced. Thus, the potential of the common gate line is unboundedly close to the OFF voltage. Accordingly, voltage close to the OFF voltage is applied to each of the gate dummy switching elements and each of the source dummy switching elements from the test switch line coupled to the common gate line, turning each of the dummy switching elements to the OFF state. Accordingly, the OFF voltage is not required to be applied to the test switch electrode. A structure that securely turns each of the dummy switching elements to the OFF state with ease only by making the test switch electrode at the open state. Further, the module side does not require a terminal for applying the OFF voltage to the test switch electrode. Thus, the structure of the module can be simplified, and reliability of the display device can be improved.

In the display device of the aspect, it is preferable that the source dummy pixels be provided on a plurality of stages along a wiring direction of the source lines, each of the test source lines be disposed along a wiring direction of the gate lines and coupled to the source dummy pixel electrodes of the source dummy pixels that are arranged on a specific stage, and the test source lines on different phases be coupled to the source dummy pixel electrodes of the source dummy pixels on respective stages.

According to the aspect, the source dummy pixels are formed on the plurality of stages from the display region, and the test source lines are coupled to the source dummy pixels on respective stages. For example, in a display device having three lines of source dummy pixels at the outside of a display region, an R test source line connecting source lines for red pixels, a G test source line connecting source lines for green pixels, and a B test source line connecting source lines for blue pixels are coupled as follows. The R test source line is coupled to predetermined source dummy pixels (source dummy pixels coupled to the source line for red pixels) arranged on a stage which is closest to the display region, the G test source line is coupled to predetermined source dummy pixels (source dummy pixels coupled to the source line for green pixels) arranged on a stage which is second-closest to the display region, and the B test source line is coupled to predetermined source dummy pixels (source dummy pixels coupled to the source line for blue pixels) arranged on a stage which is third-closest to the display region.

In such wirings, the test source lines are not arranged to be concentrated on one part but arranged on different stages separately, simplifying the formation of the wiring pattern.

In the display device of the aspect, it is preferable that the source dummy pixels be provided on at least one or more stages at the first end sides of the source lines along the wiring direction of the source lines, and each of the test source lines be disposed along the wiring direction of the gate lines and coupled to the source dummy pixel electrodes of the source dummy pixels on a specific stage and all of the test source lines be disposed on the specific stage.

In the aspect, the source lines are formed on a stage which is closest to the display region, for example. For example, as is the case with the example described above, an R test source line connecting source lines for red pixels, a G test source line connecting source lines for green pixels, and a B test source line connecting source lines for blue pixels are coupled as follows. The R test source line is coupled to the source dummy pixels coupled to the source line for red pixels and arranged on the stage which is closest to the display region, the G test source line is coupled to the source dummy pixels coupled to the source line for green pixels and arranged on the stage which is closest to the display region, and the B test source line is coupled to the source dummy pixels coupled to the source line for blue pixels and arranged on the stage which is closest to the display region. In such wirings, though plurality of test source lines are arranged to be concentrated on one part, the source dummy pixels are formed only on one stage, being able to reduce the number of components.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A liquid crystal display panel as a display device according to a first embodiment of the invention will now be described with reference to the accompanying drawing.

Figure 1:
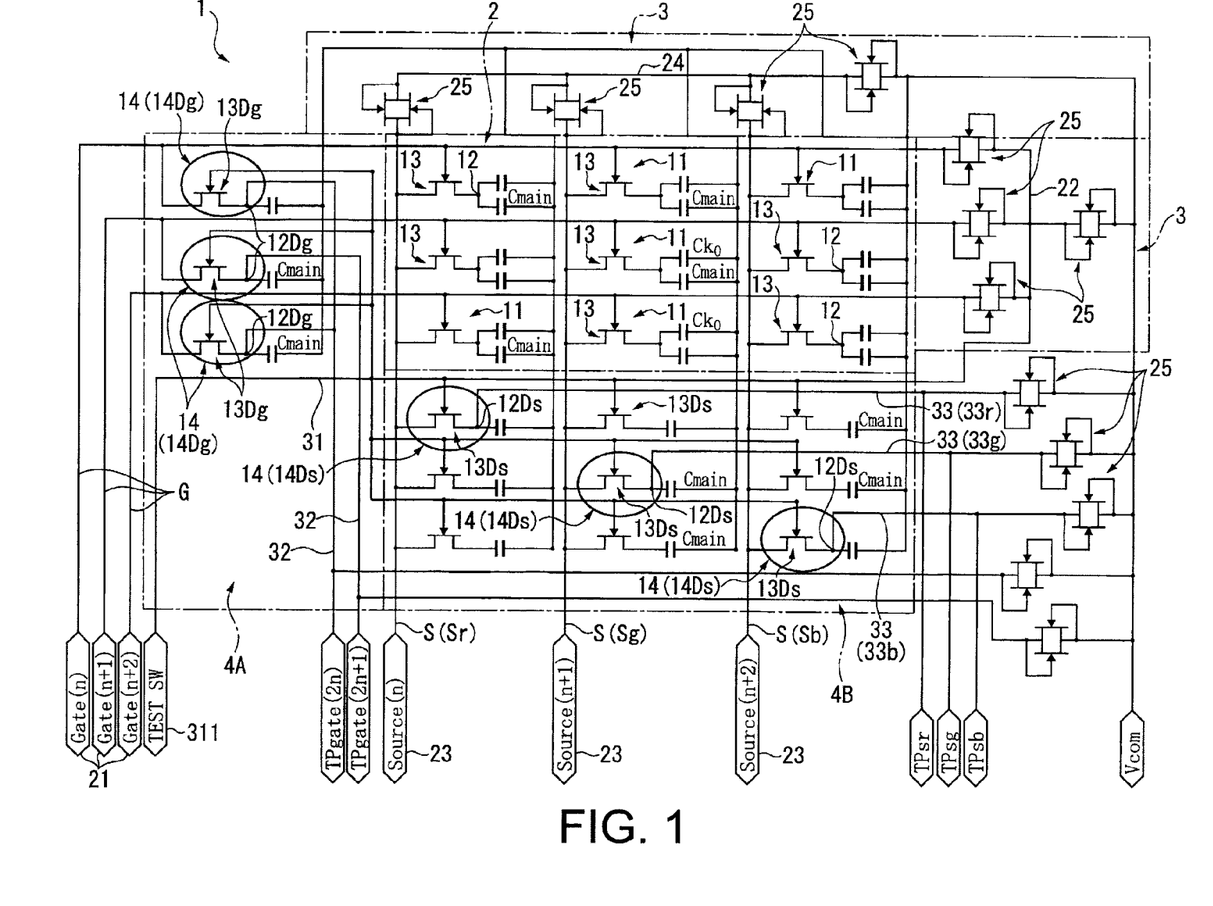
FIG. 1 is a diagram showing a circuit structure of a liquid crystal panel according to a first embodiment.

FIG. 1 is a diagram showing a circuit structure of a liquid crystal panel according to the first embodiment.

<Structure of Liquid Crystal Panel>

Referring to FIG. 1, a liquid crystal panel 1 (a liquid crystal thin film transistor (TFT) panel) as a display device displays a color image by mixing red (R), green (G), and blue (B), for example, as reference colors. In the first embodiment, an amorphous TFT panel in which amorphous silicon is used as liquid crystal which is an electro-optic material will be exemplified, but a TFT in which poly-silicon such as low-temperature poly-silicon TFT (LTPS-TFT) panel and a high-temperature poly-silicon TFT (HTPS-TFT) panel is used as liquid crystal may be used. Further, the liquid crystal panel 1 is exemplified as the display device. However, the display device may be an organic light emitting diode (OLED) panel using an organic substance such as diamine and anthracene as the electro-optic material.

Though details are not shown in the drawing, the liquid crystal panel 1 includes a pair of transparent substrates (a drive substrate and a counter substrate) disposed in an opposed manner in a chassis and spacers which divide a space between the transparent substrates into a plurality of regions. In the regions surrounded by the pair of the transparent substrates and the spacers, pixels (display pixels 11 and dummy pixels 14) are formed. In the liquid crystal panel 1, the display pixels 11 developing a single fundamental color (R, G, or B)

are aligned along a column direction and the display pixels 11 are arranged in a repeated order of R, G, and B in a row direction. The liquid crystal panel 1 includes a display region 2 in which an image is displayed, a ring transistor circuit 3, a gate dummy region 4A, and a source dummy region 4B. The ring transistor circuit 3, the gate dummy region 4A, and the source dummy region 4B are formed at a circumference of the display region 2.

On the drive substrate, a plurality of gate lines G (G1, G2, G3, G4, G5, . . . ) and a plurality of source lines S (S1, S2, S3, S4, . . . ) are disposed. The gate lines G and the source lines S are orthogonal to each other.

The gate lines G are wired nearly along a lateral direction (row direction) of the display pixels 11 of the display region 2. These gate lines G have gate connecting terminals 21 at their first ends which are at a gate dummy region 4A side. When the liquid crystal panel 1 is installed in a module such as a liquid crystal television and a projector, for example, the gate connecting terminals 21 are connected to gate electrodes that are provided to a driver driving the liquid crystal panel 1.

To second ends, which are positioned in the ring transistor circuit 3 and are opposite to the ends to which the gate connecting terminals are connected, of the gate lines G, ring transistors 25 are coupled. These gate lines G are coupled to a common gate line 22 through the ring transistors 25. That is, all of the gate lines G are connected to each other by the common gate line 22 at a second end side. The common gate line 22 is coupled through the ring transistors 25 to a counter electrode Vcom provided to the counter substrate.

The source lines S are wired nearly along a longitudinal direction (column direction) of the display pixels 11 of the display region 2. Here, a source line S connecting the display pixels 11 of the fundamental color of red nearly along the column direction is denoted as a red source line Sr, a source line S connecting the display pixels 11 of the fundamental color of green is denoted as a green source line Sg, and a source line S connecting the display pixels 11 of the fundamental color of blue is denoted as a blue source line Sb.

The source lines S have source connecting terminals 23 at their first ends which are at a source dummy region 4B side. When the liquid crystal panel 1 is installed in a module such as a liquid crystal television and a projector, for example, the source connecting terminals 23 are connected to source electrodes that are provided to a driver driving the liquid crystal panel 1.

To second ends, which are positioned in the ring transistor circuit 3 and are opposite to the ends to which the source connecting terminals are connected, of the source lines S, ring transistors 25 are coupled. The source lines S are coupled to a common source line 24 through the ring transistors 25. The common source line 24 is coupled through the ring transistors 25 to the counter electrode Vcom provided to the counter substrate.

The ring transistors 25 provided on the gate lines G an the source lines S in the ring transistor 3 perform an electrostatic protection treatment by removing static generated in the circuit and stabilize an amount of current flowing in the gate lines G and the source lines S. Thereby, current is prevented from excessively passing in the gate lines G and the source lines S, being able to reduce power consumption.

As potential difference between connecting parts at both sides of the ring transistor 25 increases, the ring transistor 25 allows more current to pass therethrough. When the potential difference is small, the ring transistor 25 allows almost no current to pass therethrough. Therefore, when the liquid crystal panel 1 is installed in a module, the current does not flow backward to the display region 2 from the common gate line 22 and the common source line 24.

In the display region 2 of the liquid crystal panel 1, pixel electrodes 12 for applying voltage to liquid crystal cells Cmain are formed near respective intersections of the gate lines G and the source lines S. In the liquid crystal cells Cmain, liquid crystal as the electro-optic material for forming the display pixel 11 is sealed. The pixel electrodes 12 are composed of indium tin oxide (ITO) films, for example.

To the drive substrate, thin film transistors (TFTs) 13 as switching elements are provided. The TFTs 13 respectively couple the pixel electrodes 12 to the source line S and switch a voltage applying state to the pixel electrodes 12 depending on voltage outputted to the gate lines G. The TFTs 13 have a gate coupled to the gate line G, a source coupled to the source line S, and a drain coupled to the pixel electrode 12.

When On voltage (15V, for example) is applied from a driver (not shown) driving the liquid crystal panel 1 through the gate line G to the gate, the TFT 13 shifts to an ON state (a state of low impedance between the source and the drain), permitting conduction of current between the source and the drain. Under this state, when a picture signal is applied to the source from a driver or an inspection device through the source line S, electric charge of the picture signal is conducted between the source and the drain so as to be applied to the pixel electrode 12 coupled with the drain.

On the other hand, when Off voltage (−10V, for example) is applied from the driver through the gate line G to the gate, the TFT 13 shifts to an OFF state (a state of high impedance between the source and the drain), restricting the conduction of the current between the source and the drain. Therefore, even if the electric charge according to the picture signal is applied to the source line S coupled to the source, the current is not conducted between the source and the drain, restricting the application of the electric charge to the pixel electrode 12.

The pixel electrodes 12 are coupled to the liquid crystal cells Cmain and to retention capacitors Ck0. The retention capacitors Ck0 suppress an amplitude of voltage necessary for driving the liquid crystal panel 1, and thus adapted for low power consumption and flicker prevention of the liquid crystal panel 1. The liquid crystal cells Cmain and the retention capacitors Ck0 are coupled not only to the pixel electrodes 12 but also to the counter electrodes of the counter substrate. To the liquid crystal cells Cmain and the retention capacitors Ck0, electric charge corresponding to the potential difference between voltage applied from the source lines S through the TFTs 13 to the pixel electrodes 12 and voltage applied to the counter electrodes is written and stored.

Each of the display pixels 11 is composed of the TFT 13, the pixel electrode 12, the liquid crystal cell Cmain, and the retention capacitor Ck0, and all of the display pixels 11 constitute the display region 2 of the liquid crystal panel 1.

In the gate dummy region 4A of the liquid crystal panel 1, a gate dummy pixel 14Dg is formed at one end side of each of the gate lines G, and in the source dummy region 4B of the liquid crystal panel 1, a source dummy pixel 14Ds is formed at one end side of each of the source lines S.

The gate dummy pixel 14Dg includes the liquid crystal cell Cmain, a dummy pixel electrode 12Dg for applying electric charge to the liquid crystal cell Cmain, and a gate dummy TFT 13Dg as a gate dummy switching element coupling the gate line G and the dummy pixel electrode 12Dg. In the gate dummy TFT 13Dg, the gate line G is coupled to a source, the dummy pixel electrode 12Dg is coupled to a drain, and a test switch line 31, which is described later, is coupled to a gate.

The gate dummy region 4A is divided into regions which respectively include the gate lines G, and the regions including the gate lines G which are not adjacent to each other are connected to each other by a test gate line 32. Thus a plurality of phases (two phases in the embodiment) is produced. Concretely, the test gate line 32 couples the dummy pixel electrodes 12Dg in the regions including the gate lines G, which are not adjacent to each other, through the gate dummy TFTs 13Dg. For example, the dummy pixel electrodes 12Dg on gate lines G (G1, G3, G5, . . . , G(2n+1)), which are arranged as odd numbered lines, are coupled to each other by the test gate line 32 (2n+1), and the dummy pixel electrodes 12Dg on gate lines G (G2, G4, G6, . . . , G(2n)), which are arranged as even numbered lines, by the test gate line 32 (2n). These test gate lines 32 include test gate terminals TPgate to which predetermined test voltage is applied in an inspection of display defect of the liquid crystal panel 1.

As is the case with the gate dummy pixel 14Dg, the source dummy pixel 14Ds includes the liquid crystal cell Cmain, a dummy pixel electrode 12Ds for applying electric charge to the liquid crystal cell Cmain, and a source dummy TFT 13Ds as a source dummy switching element which couples the source line S and the dummy pixel electrode 12D. In the source dummy TFT 13Ds, the source line S is coupled to a source, the dummy pixel electrode 12Ds is coupled to a drain, and a test switch line 31, which is described later, is coupled to a gate. The source dummy pixels 14Ds are provided to one end side of the source lines S on a plurality of stages (three stages in the embodiment).

The source dummy region 4B is divided into regions which respectively include the source lines S and the regions including the source lines S which are not adjacent to each other are connected to each other by a test gate line 33. Concretely, the test source line 33 couples the dummy pixel electrodes 12Ds that are coupled to drains of the source dummy TFTs 13Ds of the source lines S which are not adjacent to each other. Here, the test source line 33 is wired along the wiring direction of the gate lines G. Further, as described above, the source dummy pixel 14Ds is provided on the plurality of stages along the source lines S, and the test source line 33 couples the dummy pixel electrodes 12Ds aligned on a specific stage. The test source lines 33 are wired along and between the source dummy pixels 14Ds aligned on different stages.

For example, in the embodiment, the source lines S include a red source line Sr, a green source line Sg, and a blue source line Sb. Specifically, among the source dummy pixels 14Ds coupled to the red source line Sr, the dummy pixel electrodes 12Ds of the source dummy pixels 14Ds on the first stage which is closest to the display region 2 are coupled to each other by the red test source line 33r. Further, among the source dummy pixels 14Ds coupled to the green source line Sg, the dummy pixel electrodes 12Ds of the source dummy pixels 14Ds on the second stage which is second-closest to the display region 2 are coupled to each other by the green test source line 33g. Further, among the source dummy pixels 14Ds coupled to the blue source line Sb, the dummy pixel electrodes 12Ds of the source dummy pixels 14Ds on the third stage which is farthest to the display region 2 are coupled to each other by the blue test source line 33b. In the embodiment, since the source lines S include three kinds of lines S, the source dummy pixels 14Ds are provided on the three stages. However, four or more stages of source dummy pixels 14Ds may be provided.

These test source lines 33 include test source terminals TPs to which predetermined test voltage is applied in an inspection of display defect of the liquid crystal panel 1.

The test switch line 31 coupled to a gate of each of the gate dummy TFTs 13Dg and each of the source dummy TFTs 13Ds includes a test switch terminal 311 on its one end as shown in FIG. 1. From the test switch 311, a control signal for controlling the switching of the dummy TFTs 13Dg and 13Ds, that is, ON voltage enabling conduction between the source and the drain or OFF voltage making the source and the drain non-conductive is outputted, in the panel inspection.

The test switch line 31 is coupled to the common gate line 22. Thereby, a structure for applying OFF voltage to the test switch terminal 311 is not required in the liquid crystal panel 1 when the panel 1 is installed into a module.

Namely, when the liquid crystal panel 1 is installed into a module to be driven, ON voltage (+15V) is applied to one of the plurality of gate lines G and OFF voltage (−10V) is applied to the rest of the gate lines G so as to give electric charge to the liquid crystal cell Cmain of a predetermined display pixel 11 on the gate line G to which the ON voltage is applied. Then, the ON voltage is applied to each of the gate lines G in sequence so as to charge each of the display pixels 11 in sequence. Thereby, an image corresponding to the picture signal is displayed on the display region 2. Here, in the liquid crystal panel 1, 240 lines of gate lines G and 960 lines of source lines S are arranged even in a case of a resolution of quarter video graphics array (QVGA) (320 pixel×240 pixel), for example. Therefore, even if the ON voltage of +15V is applied to one of the 240 lines of gate lines G, the OFF voltage of −10V is applied to the rest of the gate lines G, whereby the common gate line 22 has a potential of "−10V" which is the OFF voltage. Here, the test switch line 31 is coupled to the common gate line 22, so that the potential of the test switch line 31 is also "−10V". Therefore, the OFF voltage is applied to the each of the dummy TFTs 13Dg and 13Ds even in a state that the test switch terminal 311 is open, and an OFF state in which the source and the drain are not conducted is produced.

<Structure of Inspection Device>

An inspection device, such as that described above, inspecting the display pixels 11 of the liquid crystal panel 1 will now be described.

Figure 2:
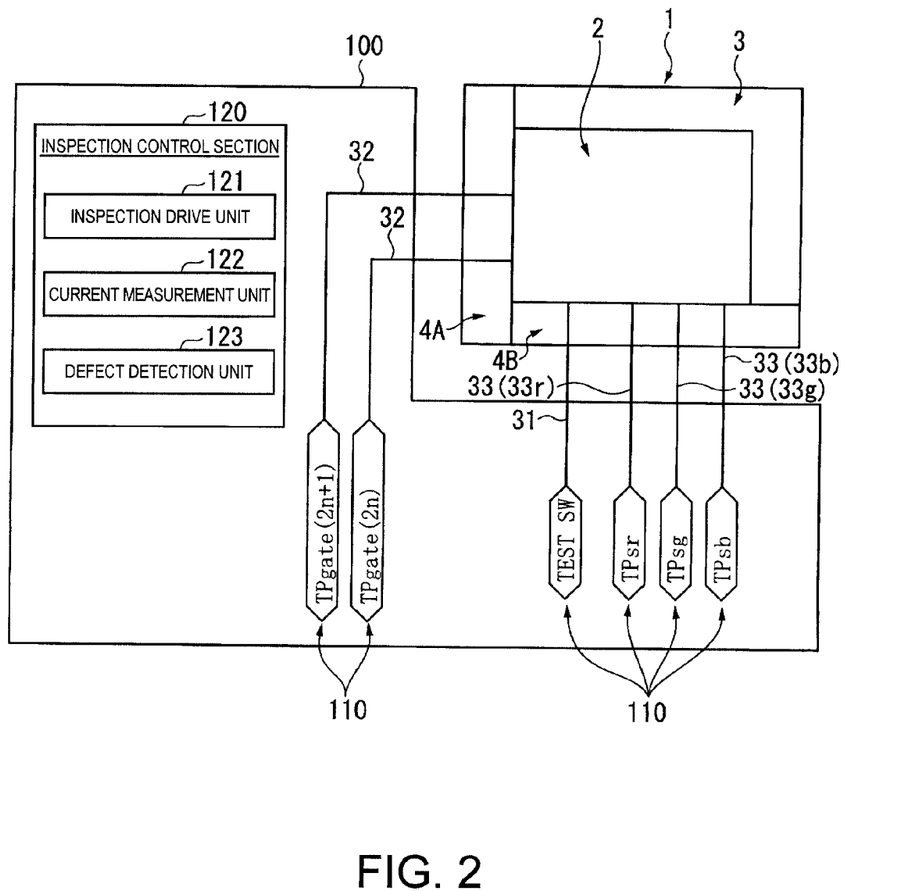
FIG. 2 is a diagram schematically showing a structure of an inspection device inspecting the liquid crystal panel.

FIG. 2 is a diagram schematically showing a structure of an inspection device inspecting the liquid crystal panel 1.

Referring to FIG. 2, the inspection device 100 includes terminal parts 110 which are coupled to the test source terminals TPs, the test gate terminals TPgate, and the test switch terminal 311 respectively provided to ends of the test source lines 33, the test gate lines 32, and the test switch line 31 of the liquid crystal panel 1.

The inspection device 100 further includes an inspection control section 120 inspecting the liquid crystal panel 1. The inspection control section 120 includes an inspection drive unit 121, a current measurement unit 122, and a defect detection unit 123, as shown in FIG. 2.

The inspection drive unit 121 applies predetermined voltage to the test source terminals TPs, the test gate terminals TPgate, and the test switch terminal 311 coupled to the terminal parts 110 so as to switch an inspection state.

Specifically, the inspection drive unit 121 applies ON voltage to the test switch terminal 311 so as to turn each of the dummy TFTs 13Dg and 13Ds to the ON state.

Then the inspection drive unit 121 applies test voltage to two test gate terminals TPgate and three test source terminals TPs in sequence so as to charge the display pixels 11 in the liquid crystal panel 1.

The current measurement unit 122 measures current which flows from each of the test source terminals TPs. For example, the unit 122 detects the current which flows to a red test source terminal TPsr in a state that the display pixels 11 for green and blue are charged.

The defect detection unit 123 determines whether there is a leak defect in the liquid crystal panel 1 based on a current value measured by the current measurement unit 122.

<Method for Inspecting Liquid Crystal Panel>

A method for inspecting the liquid crystal panel 1 with the inspection device 100 will now be described.

Figure 3:
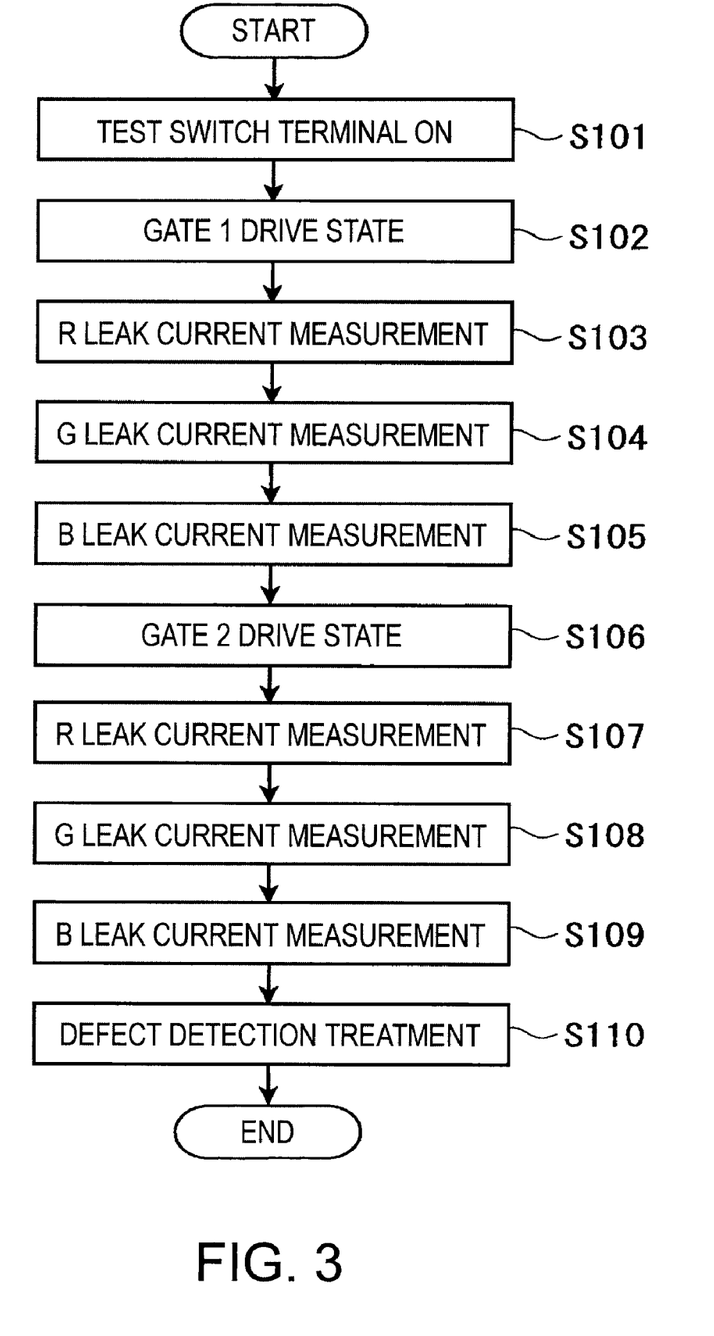
FIG. 3 is a flowchart of an inspection treatment for the liquid crystal panel.

FIG. 3 is a flowchart of an inspection treatment for the liquid crystal panel 1.

In the inspection process for the liquid crystal panel 1, the liquid crystal panel 1 is first put in the inspection device 100 and the test switch terminal 311, the test gate terminals TPgate and the test source terminals TPs are respectively coupled to predetermined terminal parts 110 of the inspection device 100.

Then the inspection drive unit 121 of the inspection device 100 applies ON voltage (+15V, for example) to the test switch terminal 311 (step S101). Thereby, each of the gate dummy TFTs 13Dg and each of the source dummy TFTs 13Ds are tuned to the ON state, producing a state that the conduction between the source and the drain is permitted.

Then, the inspection drive unit 121 applies ON voltage (+15V, for example) to the test gate terminals TPgate (2n+1) so as to turn the gate dummy TFTs 13Dg coupled to the gate lines G (2n+1), which are arranged as the odd numbered lines, to an ON state, and applies OFF voltage (−10V, for example) to the test gate terminals TPgate (2n) so as to turn the gate dummy TFTs 13Dg coupled to the gate lines G (2n), which are arranged as the even numbered lines, to an OFF state (step 5102: gate 1 driving state).

Then the inspection drive unit 121 applies ON voltage (+3V, for example) to the green test source terminal TPsg and the blue test source terminal TPsb while maintaining the gate 1 driving state. Meanwhile, the current measurement unit 122 measures a current value Ar1 of the current flowing from the red test source terminal TPsr (step S103).

The inspection drive unit 121 next applies ON voltage (+3V, for example) to the red test source terminal TPsr and the blue test source terminal TPsb while maintaining the gate 1 driving state. Meanwhile, the current measurement unit 122 measures a current value Ag1 of the current flowing from a green test source terminal TPsg (step S104).

Further, the inspection drive unit 121 applies ON voltage (3V, for example) to the red test source terminal TPsr and the green test source terminal TPsg while maintaining the gate 1 driving state. Meanwhile, the current measurement unit 122 measures a current value Ab1 of the current flowing from the blue test source terminal TPsb (step S105).

After that the inspection drive unit 121 applies OFF voltage (−10V, for example) to the test gate terminals TPgate (2n+1) so as to turn the gate dummy TFTs 13Dg coupled to the gate lines G (2n+1), which are arranged as the odd numbered line, to the OFF state, and applies ON voltage (+15V, for example) to the test gate terminals TPgate (2n) so as to turn the gate dummy TFTs 13Dg coupled to the gate lines G (2n), which are arranged as the even numbered lines, to the ON state (step 5106: gate 2 driving state).

Subsequently, treatments nearly same as the step 5103 through the step 5105 are performed. That is, the inspection drive unit 121 applies ON voltage (+3V, for example) to the green test source terminal TPsg and the blue test source terminal TPsb while maintaining the gate 2 drive state, and the current measurement unit 122 measures a current value Ar2 of the current flowing from the red test source terminal TPsr (step S107). Further, the inspection drive unit 121 applies ON voltage (+3V, for example) to the red test source terminal TPsr and the blue test source terminal TPsb while maintaining the gate 2 drive state, and the current measurement unit 122 measures a current value Ag2 of the current flowing from the green test source terminal TPsg (step S108). Further, the inspection drive unit 121 applies ON voltage (+3V, for example) to the red test source terminal TPsr and the green test source terminal TPsg while maintaining the gate 2 drive state, and the current measurement unit 122 measures a current value Ab2 of the current flowing from the blue test source terminal TPsb (step S109).

Then the defect detection unit 123 performs a defect detection treatment based on each of the current values obtained in the steps 103 through 105, and 107 through 109 (step 5110).

Specifically, the defect detection unit 123 calculates difference values of the current values obtained at the test source terminals TPsr, that is, a difference value between the current values Ar1 and Ar2, a difference value between the current values Ag1 and Ag2, and a difference value between the current values Ab1 and Ab2. Then the detect detection unit 123 determines whether these difference values are equal to or more than a predetermined threshold value. In a case where the difference values are equal to or more than the predetermined threshold value, the defect detection unit 123 determines that there is a leak defect in the liquid crystal panel 1, while in a case where the difference values are less than the predetermined threshold value, the defect detection unit 123 determines that there is no leak defect in the liquid crystal panel 1.

<Advantageous Effect of First Embodiment>

As described above, the liquid crystal panel 1 of the first embodiment includes the gate dummy pixels 14Dg and the source dummy pixels 14Ds at the outside of the display region 2. The gate dummy TFTs 13Dg constituting the gate dummy pixels 14Dg and the source dummy TFTs 13Ds constituting the source dummy pixels 14Ds are coupled to each other by the test switch line 31. Further, a test gate line 32 is coupled to the dummy pixel electrodes 12Dg coupled to odd numbered gate lines G(2n+1) and another test gate line 32 is coupled to the dummy pixel electrodes 12Dg coupled to even numbered gate lines G(2n). Furthermore, the red test source line 33r is coupled to the dummy pixel electrodes 12Ds coupled to the red source line Sr, the green test source line 33g is coupled to the dummy pixel electrodes 12Ds coupled to the green source line Sg, and the blue test source line 33b is coupled to the dummy pixel electrodes 12Ds coupled to the blue source line Sb.

Accordingly, the gate dummy TFTs 13Dg and the source dummy TFTs 13Ds can be turned to the ON state by applying the ON voltage to the test switch terminal 311 and therefore the test voltage can be applied to each of the gate lines G and each of the source lines S respectively from the test gate terminals TPgate and the test source terminals through these dummy TFTs 13Dg and the source dummy TFTs 13Ds. Accordingly, the dummy pixels 14Dg and 14Ds provided for electrostatic protection can be used as an inspection circuit without providing an exclusive inspection circuit having a complicated structure to the liquid crystal panel 1 or the inspection device 100. Thus the structure related to the inspection circuit can be simplified in the liquid crystal panel 1. Further, the defect inspection can be performed only by applying predetermined voltage to the test switch terminal 311, the two test gate terminals TPgate, and the three test source terminals TPs. Therefore, the gate lines G or the source lines S need not be connected to each other by a probe or the like in the inspection, for example, thus being able to easily perform the inspection of the liquid crystal panel 1.

The test switch line 31 is connected with the common gate line 22 which connects the second ends of the gate lines G.

Therefore, the liquid crystal panel 1 is installed in a module such as a liquid crystal television and a projector only by coupling each of the gate lines G, each of the source lines S, and the counter electrode Vcom to the driver and thus the test switch terminal 311, the test gate terminals TPgate, and the test source terminals TPs can be left in an open state, that is, can be left in a non-connected manner. Namely, in the normal drive of the liquid crystal panel 1, the common gate line 22 has a potential which is close to OFF voltage, and the OFF voltage of the common gate line 22 is applied to each of the dummy TFTs 13Dg and 13Ds so as to turn the TFTs 13Dg and 13Ds to the OFF state. Thus the ON voltage for maintaining the OFF state of the dummy TFTs 13Dg and 13Ds is not required to be applied to the test switch terminal 311. Accordingly, more stable drive of the liquid crystal panel 1 can be realized compared to a structure in which the OFF voltage is kept to be applied to the test switch terminal 311, being able to improve reliability of the device. Further, as described above, the dummy TFTs 13Dg and 13Ds are securely turned to the OFF state in the normal drive of the liquid crystal panel 1, thus requiring no control of applying a voltage to the test gate terminals TPgate and the test source terminals TPs.

Further, between each of the gate lines G and the common gate line 22, the ring transistor 25 is provided. Therefore, the potential difference between the gate line G, to which drive voltage is applied, and the common gate line 22 is large, so that the current flows from the gate line G, to which the drive voltage is applied, to the common gate line 22. While, the potential difference between the gate lines G, to which the OFF voltage is applied, and the common gate line 22 is approximately zero, whereby no current flows. Therefore, stable drive of the liquid crystal panel 1 can be realized without the flow of the current from the common gate line 22 to the gate line G to which the OFF voltage is applied.

In the liquid crystal panel 1, among the source dummy pixels 14Ds coupled to the red source line Sr, the dummy pixel electrodes 12Ds of the source dummy pixels 14Ds on the first stage which is closest to the display region 2 are coupled to each other by the red test source line 33r. Among the source dummy pixels 14Ds coupled to the green source line Sg, the dummy pixel electrodes 12Ds of the source dummy pixels 14Ds on the second stage which is second-closest to the display region 2 are coupled to each other by the green test source line 33g. Further, among the source dummy pixels 14Ds coupled to the blue source line Sb, the dummy pixel electrodes 12Ds of the source dummy pixels 14Ds on the third stage which is farthest to the display region 2 are coupled to each other by the blue test source line 33b.

Therefore, the test source lines 33 to be wired in parallel to the gate lines G are not disposed in a manner gathered to one part but disposed discretely on multiple stages. Accordingly, in a process for forming wirings of the liquid crystal panel 1, a plurality of test source lines 33 are easily formed without being formed in a small area between the dummy pixels.

Second Embodiment

A second embodiment of the invention will be described with reference to the accompanying drawing.

Figure 4:
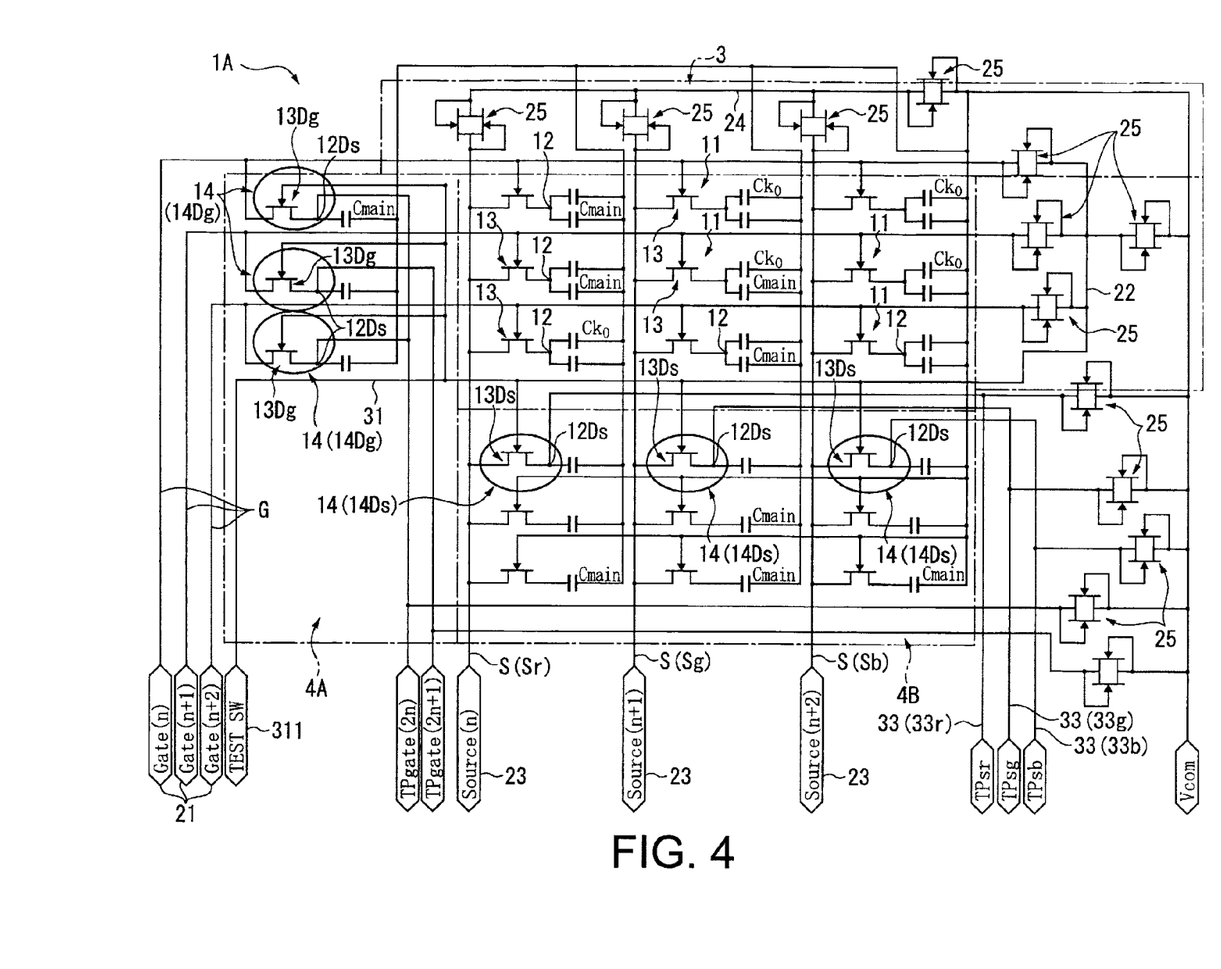
FIG. 4 is a circuit diagram schematically showing a structure of a liquid crystal panel of a second embodiment.

FIG. 4 is a circuit diagram schematically showing a structure of a liquid crystal panel of the second embodiment. Elements same as those of the first embodiment will be given the same reference numbers and their description will be omitted.

A liquid crystal panel 1A of the second embodiment has a similar structure as that of the first embodiment except for wiring positions of the test source lines 33.

The liquid crystal panel 1A includes the display region 2, the ring transistor circuit 3, the gate dummy region 4A, and the source dummy region 4B, as is the case with the liquid crystal panel 1 of the first embodiment.

In the source dummy region 4B of the liquid crystal panel 1A, the red test source line 33r, the green test source line 33g, and the blue test source line 33b are coupled to the source dummy pixels 14Ds which are closest to the display region 2. Namely, among the dummy pixel electrodes 12Ds of the source dummy pixels 14Ds on the first stage which is the closest to the display region 2, the dummy pixel electrodes 12Ds coupled to the red source line Sr are connected to each other by the red test source line 33, the dummy pixel electrodes 12Ds coupled to the green source line Sg are connected to each other by the green test source line 33, and the dummy pixel electrodes 12Ds coupled to the blue source line Sb are connected to each other by the blue test source line 33.

<Advantageous Effect of Second Embodiment>

In the liquid crystal panel 1A of the second embodiment, the test source lines 33 are coupled to the source dummy pixels 14Ds which are closest to the display region 2. Therefore, the liquid crystal panel 1 may have a structure in which the source dummy pixels 14Ds are disposed along the source line S on a specific stage. Thus the inspection circuit having a simple structure can be installed in a liquid crystal panel 1 having the source dummy region 4B which is small.

Modifications

It should be noted that the present invention is not limited to the aforementioned embodiments but includes various modifications or improvements within a scope of this invention.

In the above embodiments, the gate dummy region 4A is divided into two phases and the test gate lines 32 are coupled to the gate lines G of respective phases, but the gate dummy region 4A may be divided into three or more phases and the test gate lines 32 may be coupled to respective phases. In a similar manner, the source dummy region 4B is divided into three phases and the test source lines 33 are coupled to each of the phases, but the region 4B may be divided into four or more phases or may be divided into two phases and the test source lines 33 may be coupled to respective phases.

Further, in the gate dummy region 4A, the gate dummy pixels 14Dg are formed on a specific stage along the gate line G, but the gate dummy pixels 14Dg may be formed on a plurality of stages as is the case with the source dummy pixels 14Ds.

Specific structure or procedure according to the embodiments of the invention may be adequately changed without departing from the scope of the invention.

The entire disclosure of Japanese Patent Application No. 2008-235372, filed Sep. 12, 2008 is hereby expressly incorporated by reference herein in its entirety.

What is claimed is:

1. A display device, comprising,
a drive substrate;
a counter substrate opposed to the drive substrate;
an electro-optic material sealed between the drive substrate and the counter substrate;
a plurality of source lines formed on the drive substrate;
a plurality of gate lines formed on the drive substrate in an orthogonal manner to the source lines;
a plurality of pixel electrodes formed near intersections of the plurality of source lines and the plurality of gate lines and applying electric charge outputted to the source lines to the electro-optic material;

switching elements coupled to the gate lines and switching conduction states between the source lines and the pixel electrodes;

a counter electrode formed on the counter substrate and coupled to the pixel electrodes;

gate dummy pixels including:
  gate dummy pixel electrodes provided to first end sides of the gate lines and applying the electric charge from the gate lines to the electro-optic material; and
  gate dummy switching elements coupling the gate lines and the gate dummy pixel electrodes and switching conduction states between the gate lines and the gate dummy pixel electrodes;

source dummy pixels including:
  source dummy pixel electrodes provided to first end sides of the source lines and applying the electric charge from the source lines to the electro-optic material; and
  source dummy switching elements coupling the source lines and the source dummy pixel electrodes and switching conduction states between the source lines and the source dummy pixel electrodes;

a test switch line coupled to the gate switching elements and the source dummy switching elements and transmitting a control signal for controlling switching of the conduction states to the gate dummy switching elements and the source dummy switching elements;

a plurality of test gate lines respectively coupled to the gate dummy pixel electrodes that are not adjacent to each other in such a manner that the gate lines provided with the gate dummy pixel electrodes are divided into two or more phases; and a plurality of test source lines respectively coupled to the source dummy pixel electrodes that are not adjacent to each other in such a manner that the source lines provided with the source dummy pixel electrodes are divided into two or more phases.

2. The display device according to claim 1, wherein the plurality of gate lines are connected with each other, by a common gate line coupled to the counter electrode, at second end sides that are opposite sides to the first end sides on which the gate dummy pixels are provided, and the test switch line is coupled to the common gate line.

3. The display device according to claim 1, wherein the source dummy pixels are provided on a plurality of stages along a wiring direction of the source lines, each of the test source lines is disposed along a wiring direction of the gate lines and coupled to the source dummy pixel electrodes of the source dummy pixels that are arranged on a specific stage, and the test source lines on the different phases are coupled to the source dummy pixel electrodes of the source dummy pixels on respective stages.

4. The display device according to claim 1, wherein the source dummy pixels are provided on at least one or more stages at the first end sides of the source lines along the wiring direction of the source lines, and each of the test source lines is disposed along the wiring direction of the gate lines and coupled to the source dummy pixel electrodes of the source dummy pixels on a specific stage and all of the test source lines are disposed on the specific stage.

* * * * *